(12) United States Patent
Jably et al.

(10) Patent No.: US 11,407,383 B2
(45) Date of Patent: Aug. 9, 2022

(54) TOOTHED WHEEL FOR A GEAR MOTOR OF A WINDOW WIPER

(71) Applicant: Valeo Systèmes d'Essuyage, Le Mesnil Saint Denis (FR)

(72) Inventors: Fabrice Jably, Chatellerault (FR); Christophe Rabache, Chatellerault (FR); Alain Servin, Chatellerault (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 311 days.

(21) Appl. No.: 16/339,586

(22) PCT Filed: Aug. 24, 2017

(86) PCT No.: PCT/EP2017/071307
§ 371 (c)(1),
(2) Date: Apr. 4, 2019

(87) PCT Pub. No.: WO2018/065148
PCT Pub. Date: Apr. 12, 2018

(65) Prior Publication Data
US 2020/0039471 A1 Feb. 6, 2020

(30) Foreign Application Priority Data
Oct. 7, 2016 (FR) ...................................... 1659680

(51) Int. Cl.
*B60S 1/34* (2006.01)
*B60S 1/26* (2006.01)
(Continued)

(52) U.S. Cl.
CPC ............... *B60S 1/3495* (2013.01); *B60S 1/26* (2013.01); *F16H 21/40* (2013.01); *H02K 7/116* (2013.01); *H02K 15/14* (2013.01)

(58) Field of Classification Search
CPC .......... B60S 1/166; B60S 1/3495; B60S 1/26; B60S 1/24; B60S 1/16; B60S 1/18;
(Continued)

(56) References Cited

U.S. PATENT DOCUMENTS

2010/0011892 A1 * 1/2010 Lassalle .................. F16H 55/17
74/388 R

FOREIGN PATENT DOCUMENTS

| CN | 101203409 A | 6/2008 |
|---|---|---|
| DE | 3405299 A1 | 8/1985 |

(Continued)

OTHER PUBLICATIONS

International Search Report and Written Opinion issued in corresponding International Patent Application No. PCT/EP2017/071307, dated Nov. 9, 2017 (11 pages).
(Continued)

*Primary Examiner* — Katina N. Henson
(74) *Attorney, Agent, or Firm* — Osha Bergman Watanabe & Burton LLP

(57) ABSTRACT

The invention relates to a toothed wheel (116) for a gear motor (10) of a window wiper, in particular of a motor vehicle, this wheel having a central member (120, 128) defining an axis of rotation A and two opposite substantially parallel faces, a first of said faces including an orifice (124) having an axis B and intended to receive a pin (26) of a linkage (38) of the gear motor, characterized in that it comprises, on said first face, abutment means (128*a*, 154*a*) in an axial direction and/or in a radial direction relative to axis A and means (128*a*, 154*a*, 152*a*) for guiding sliding in a circumferential direction about the axis A, said abutment and guide means being configured to cooperate with said pin during the assembly of the toothed wheel with the linkage in order to facilitate the insertion of the pin into the orifice.

26 Claims, 3 Drawing Sheets

(51) Int. Cl.
    *F16H 21/40*     (2006.01)
    *H02K 7/116*     (2006.01)
    *H02K 15/14*     (2006.01)

(58) Field of Classification Search
    CPC . B60S 1/28; F16H 21/40; F16H 35/00; F16H 37/04; F16H 55/17; H02K 7/116; H02K 15/14
    USPC .... 15/250.03, 250.3, 250.31; 74/388 R, 425; 33/203
    See application file for complete search history.

(56) References Cited

FOREIGN PATENT DOCUMENTS

| | | | |
|---|---|---|---|
| EP | 2639119 A1 | 9/2013 | |
| JP | H08310350 A | * 11/1996 | ................ B60S 1/08 |
| JP | H08310350 A | * 11/1996 | ................ B60S 1/08 |

OTHER PUBLICATIONS

First Office Action in corresponding Chinese Application No. 201780061838.3, dated Sep. 22, 2021 (16 pages).

* cited by examiner

TOOTHED WHEEL FOR A GEAR MOTOR OF A WINDOW WIPER

TECHNICAL FIELD

The present invention concerns in particular a toothed wheel for a gear motor of a window wiper, in particular for motor vehicles.

PRIOR ART

A window wiper gear motor comprises an electric motor the rotor shaft of which is extended out of the motor by a lead screw that enters a hollow casing formed by a cover. That casing includes in its hollow volume a gear motor including a toothed wheel driven in rotation by the lead screw and driving a linkage connected to said pin in a fixed manner via an eccentric pin engaged in an orifice of said wheel in a manner freely movable in rotation and in axial translation. This linkage enables transformation of the continuous movement in rotation of this wheel into an alternating movement in rotation of a shaft passing through the end wall of the casing or cover and driving a wiper device including a wiper rubber.

Assembling the linkage and the toothed wheel includes a step in which the aforementioned pin is engaged in the orifice of the toothed wheel. At present this assembly is carried out manually and necessitates dexterity because the assembly movement is not a simple one. It further necessitates a non-negligible assembly time.

The invention proposes an improvement to this technology that is simple, effective and economical and allows automatic assembly of a linkage and a toothed wheel.

SUMMARY OF THE INVENTION

To this end the invention proposes a toothed wheel for a gear motor of a window wiper, in particular of a motor vehicle, this wheel having a central member defining an axis of rotation A and two opposite substantially parallel faces, a first of said faces including an orifice having an axis B and intended to receive a pin of a linkage of the gear motor, characterized in that it comprises, on said first face, abutment means in an axial direction and/or in a radial direction relative to axis A and means for guiding sliding in a circumferential direction about the axis A, said abutment and guide means being configured to cooperate with said pin during the assembly of the toothed wheel with the linkage in order to facilitate the insertion of the pin into the orifice.

Thus abutment and guide means are provided on the toothed wheel and configured so as to be able to cooperate with the pin of the linkage and thus to allow automatic or controlled assembly of the toothed wheel and the linkage. This is advantageous in that a relatively long and complex manual operation is replaced by an automatic operation, thereby limiting the number of errors and the risk of incorrect assembly.

The toothed wheel according to the invention may have one or more of the following features, separately from one another or in combination with one another:
- the toothed wheel comprises on said first face a cylindrical bush having an axis A surrounded by a toothed ring and connected to the latter by ribs,
- the abutment means comprise radial first abutment means,
- the first abutment means are formed by or situated on said bush,
- the abutment means comprise axial second abutment means,
- the second abutment means are formed by an abutment rib,
- the abutment rib has a substantially circumferential orientation about the axis A,
- the abutment means comprise circumferential third abutment means;
- the third abutment means are formed by the bottom of a cradle having a C or U general shape,
- said cradle extends around said axis B,
- the guide means comprise an external cylindrical first surface extending around said axis A or a portion of such a surface,
- the first surface is formed by or situated on said bush,
- the guide means comprise a plane second surface substantially perpendicular to said axis A,
- the second surface is formed by or situated on said abutment rib;
- the guide means comprise an internal cylindrical third surface extending around said axis A or a portion of such a surface, and
- the third surface is formed by or situated on a guide rib.

The present invention also concerns a window wiper gear motor, in particular for motor vehicles, comprising at least one toothed wheel as described above.

The present invention further concerns a window wiper system, in particular for motor vehicles, comprising at least one toothed wheel or one gear motor as described above.

The present invention finally concerns a method of assembling an assembly including a toothed wheel according to any one of the above embodiments and a linkage for a window wiper gear motor, in particular for motor vehicles, comprising the steps consisting in:

a) moving one of the elements comprising the linkage and the toothed wheel toward the other of the elements by axial and/or radial movement in translation relative to the axis A from a spaced first position in which the axis C of the pin of said system is substantially parallel to the axis A to a contact second position in which said pin is in axial and/or radial contact against said abutment means, b) moving one of these elements in rotation about the axis A relative to the other of the elements by sliding the pin on said guide means from the aforementioned second position to a third position in which the axes B and C coincide, and c) moving one of these elements toward the other of the elements by axial movement in translation relative to the axis A from the third position to a fourth position in which the pin is engaged in said orifice.

In the second position the pin is in radial and axial contact against the toothed wheel.

In the third position the pin is in circumferential contact against the toothed wheel.

The steps a), b) and c) are advantageously performed by robot means.

DESCRIPTION OF THE FIGURES

The invention will be better understood and other details, features and advantages of the invention will become apparent on reading the following description given by way of nonlimiting example and with reference to the appended drawings, in which.

DETAILED DESCRIPTION

It should be noted that the figures show the invention in detail for the purposes of execution of the invention, said figures of course being able if necessary to serve to define the invention better.

Figure 1:
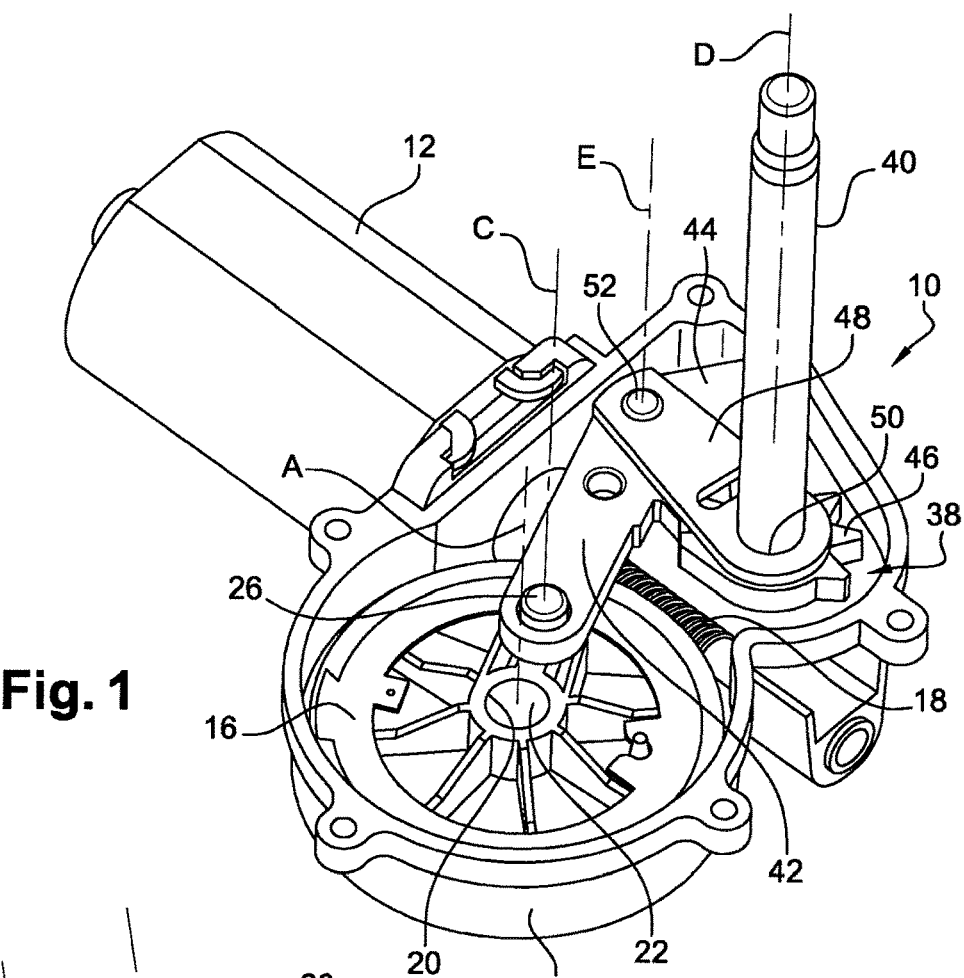
FIG. 1 is a diagrammatic and partially cutaway perspective view of a window wiper gear motor.

Refer first to FIG. 1 which shows a window wiper gear motor 10 that comprises an electric motor 12 and a hollow casing 14 provided with a closing cover or plate (not shown).

This casing 14 contains a gear motor constituted of a toothed wheel 16 rotatable about an axis A and driven by a lead screw 18 on the rotor of the electric motor 12.

Figure 2:
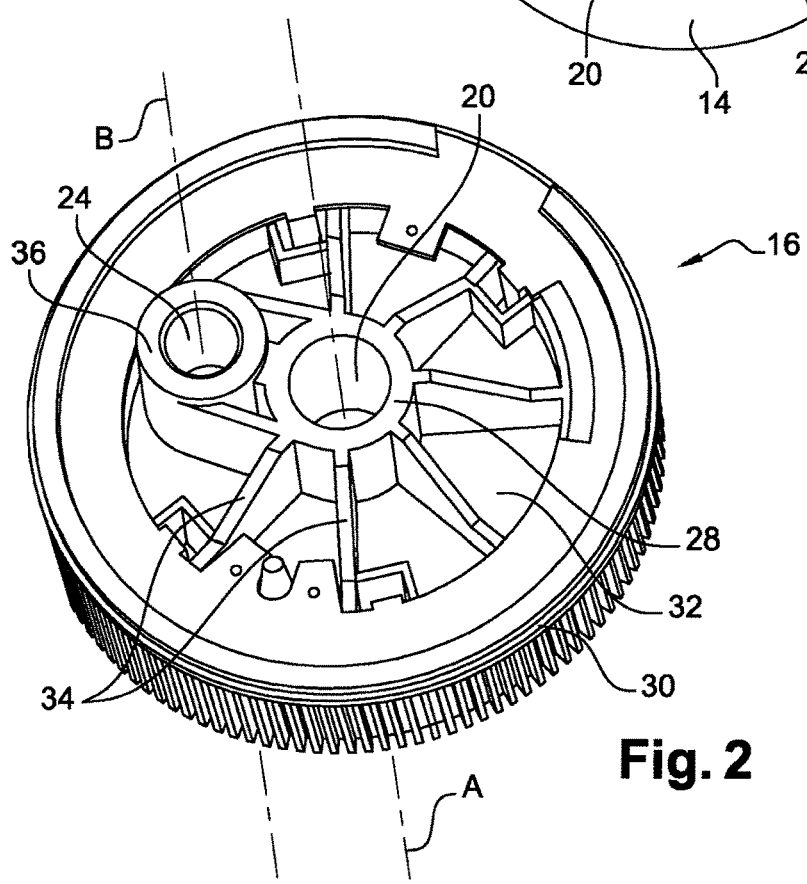
FIG. 2 is a diagrammatic perspective view of a toothed wheel of the gear motor from FIG. 1.

The wheel 16, seen better in FIG. 2, includes a central orifice 20 having an axis A intended to receive a cylindrical finger 22 of the casing 14. The finger 22 may instead be mounted in a cylindrical housing of the casing 14. The wheel 16 includes another orifice 24 that is eccentric, has an axis B and is intended to receive a cylindrical pin 26 having an axis C. The pin 26 is free to move in rotation and in translation in the orifice 24. In the assembled position the axes A and B are substantially parallel and the axes B and C coincide.

Here the toothed wheel 16 includes a central bush 28 having an axis A and the internal bore of which defines the orifice 20. This bush 28 is connected to a ring 30 with external teeth by a plane web 32 substantially perpendicular to the axis A. On at least one of the faces of the wheel (that visible in FIG. 2, which is termed the upper face hereinafter) the bush 28 is connected to the ring 30 by substantially radial ribs 34. The wheel further comprises on the upper face a sleeve 36 having an axis B and the internal bore of which defines the orifice 24. The axial free ends (relative to the axis A) of the bush 28 and the sleeve 36 situated on the side of the upper face are situated in planes perpendicular to the axis A that are distinct and spaced from the plane of the web 32.

The pin 26 is connected to a linkage 38, here employing meshing teeth, that enables transformation of the continuous movement in rotation of the wheel 16 into alternating movement in rotation of a shaft 40 having an axis D. The shaft 40 is accommodated in a housing situated at the bottom of the casing 14 and rests on a bearing that cannot be seen.

The linkage 38 consists of a link 42 connected at one of its ends to the pin 26 and allowing an end section of the pin 26 to pass beyond its external face and having at the other end a toothed sector 44. This toothed sector meshes with another toothed sector 46 connected in a fixed manner to the shaft 40.

The two toothed sectors 44 and 46 are maintained in interengagement at all times by two swing arms 48 situated on respective opposite sides of the longitudinal faces of the toothed sectors, forming a crank and enabling rigid connection of the link 42 and the shaft 40.

These two swing arms 48 are held together on the one hand by means of an opening 50 provided at one end of said swing arms that comes to surround an end of the shaft 10 and on the other hand by a pivot 52 that has an axis E, is free to rotate and is disposed at the other end of said swing arms. The two swing arms therefore have a movement in rotation about the shaft 40. The axes A, B, C, D and E are substantially parallel.

The central part of the pivot 52 is inserted with minimum clearance in the link 42, its two ends being engaged in bores in the two swing arms 48.

The pivot 52 has an axial dimension greater than the combined thickness of the two swing arms 48 and the link 42 so that it has two free ends that project on respective opposite sides of the swing arms. The two swing arms 48 are mounted with a tight fit on the pivot 52.

FIGS. 1 and 2 show a known gear motor 10 where the assembly of the toothed wheel 16 with the linkage 38 is carried out manually, which has disadvantages as mentioned above.

Figure 3:
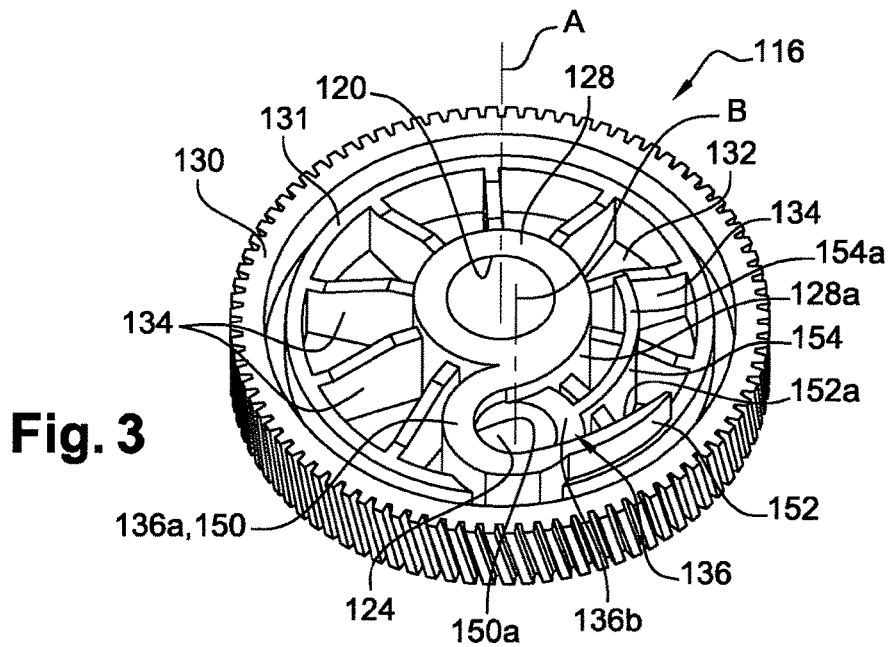
FIG. 3 is a diagrammatic perspective view of a toothed wheel according to the invention.

FIG. 3 shows a toothed wheel according to one embodiment of the invention.

In the nonlimiting example shown the toothed wheel 116 has a general structure similar to that of the wheel 16 from FIG. 2 and includes a central bush 128 the internal bore of which defines an orifice 120 having an axis A. This bush 128 is connected to a ring 130 with external teeth by a plane web 132 substantially perpendicular to the axis A.

On at least one of the faces of the wheel (that visible in FIG. 3) the bush 128 is connected either to substantially radial ribs 134 that extend radially outward as far as the ring 130 or to a circular rib 131 extending between the bush and the ring. The rib 131 may be regarded as forming part of the ring 130. The wheel 116 further comprises at the level of this same face a sleeve 136 the internal bore of which defines the orifice 124 having an axis B. The axes A and B are substantially parallel.

In the example shown the plane P1 passing through the axial free end of the bush 128 situated on the side of the aforementioned face is at a distance from that P2 passing through the web 132 (cf. FIG. 3a).

Here the sleeve 136 is axially stepped and includes a first angular sector 136a the axial free end of which situated on the side of the upper face lies substantially in the plane P1. The sleeve 136 comprises a remaining or complementary second angular sector 136b that lies in a plane P3 parallel to P1 and situated between P1 and P2 (cf. FIG. 3a).

The first sector 136a subtends an angle around the axis B greater than or equal to 180°. It forms a cradle 150 having a C or U general shape the opening of which is oriented in a circumferential direction around the axis A. A radially internal circumferential end of this sector 136a or of the cradle 150 is connected to the bush 128. The opposite, radially external circumferential end is situated at the level of the rib 131 and is connected to another so-called guide rib 152.

The guide rib 152 has a circumferential orientation around the axis A and extends both circumferentially in line with the external circumferential end of the cradle 150 and axially in line with the rib 131. The axial free ends (situated on the side of the aforementioned face) of the rib 152, the cradle 150 and the bush 128 are substantially coplanar in the plane P1. The axial free end of the rib 131 situated on the same side is situated in a plane P4 situated between and parallel to the planes P3 and P2.

Another guide rib 154 having a circumferential general orientation about the axis A extends between the bush 128 and the rib 131. The rib 154 therefore has a radius between the outside radius of the bush 128 and the radius of the rib 131 or of the rib 152. The rib 154 has a circumferential end that is a free end or is connected to one of the ribs 134 and its other circumferential end is connected to the bush 136, in particular to its second sector 136b. The upper free ends of the rib 154 and of the sleeve 136 situated on the side of the aforementioned face are coplanar and lie in the plane P3. The upper free ends of the radial ribs 134 are not necessarily plane and lie between the planes P3 and P4.

The cylindrical external surface 128a of the bush 128 defines first abutment means in the sense of the invention that are intended to cooperate in abutment with the cylindrical external surface of a pin of the linkage, as described in more detail hereinafter. This surface 128a defines radial, here inward (from the axis A), abutment means. The cylindrical external surface 128a of the bush 128 further defines guide means that are intended to cooperate by sliding with the cylindrical external surface of the pin.

The upper edge surface 154a of the rib 154 defines second abutment means that are intended to cooperate in axial abutment with the free end face of the pin of the linkage. The upper edge surface 154a of the rib 154 further defines guide means in the plane P3 that are intended to cooperate by sliding with the free end face of the pin. This is also the case of the upper edge surface of the second sector 136b of the sleeve 136 which lies in the plane P3.

The cylindrical internal surface 150a of the cradle 150 defines abutment means that are intended to cooperate in circumferential abutment with the cylindrical external surface of the pin.

The radially internal cylindrical surface 152a of the rib 152 defines guide means that are intended to cooperate by sliding with the cylindrical external surface of the pin.

FIGS. 4a to 4d show steps in the assembly of the toothed wheel 116 from FIG. 3 with a linkage 38 of the type described above with reference to FIG. 1.

The steps of the method are preferably carried out automatically by controlled means including for example a robot arm.

Figures 4A, 4B:
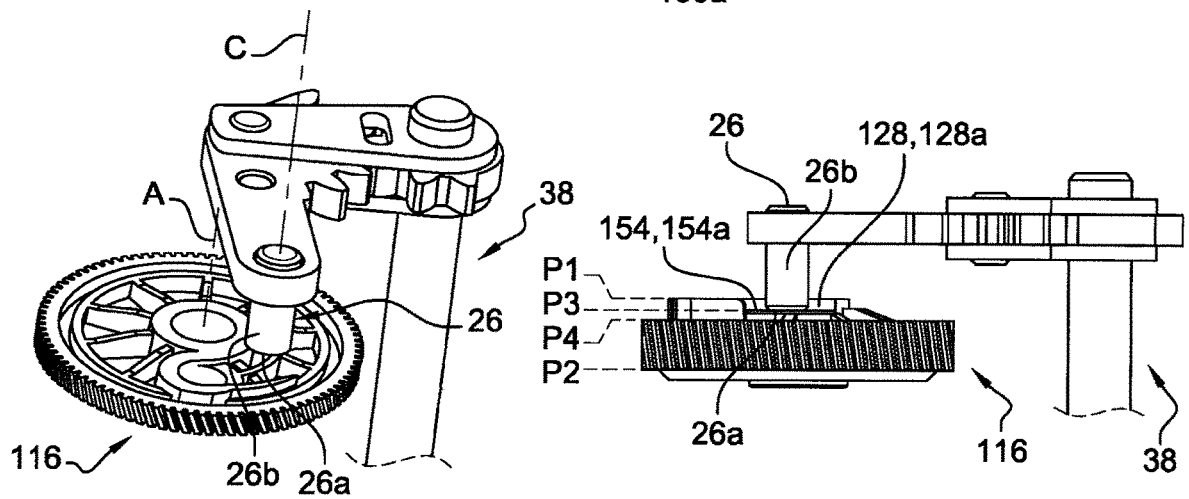
FIGS. 4a to 4d are diagrammatic perspective views of the toothed wheel from FIG. 3 and a linkage and show steps in the assembly of these elements.

A first step of the method shown in FIG. 4a consists in positioning the toothed wheel 116 and the linkage 38 in the immediate vicinity of one another, the linkage being situated on the side of the aforementioned upper face of the toothed wheel. They are then in a first position, termed the spaced position, in which the axis C of the pin 26 of the linkage 38 is substantially parallel to the axis A. The lower end face 26a of the pin is at an axial distance from the wheel and the cylindrical external face 26b of the pin is at a radial and circumferential distance from the wheel.

Another step of the method shown in FIG. 4b consists in moving one of the elements from the linkage 38 and the toothed wheel 116 toward the other of the elements by axial and/or radial movement in translation relative to the axis A from the aforementioned first position to a contact second position in which the pin 26 is in axial and/or radial contact against the wheel. In the second position the axes A and C are still parallel. In the example shown axial movement in translation of one of the elements toward the other of the elements allows the face 26a of the pin 26 to come into axial abutment on the surface 154a of the rib 154 (FIG. 3).

Radial movement in translation of one of the elements towards the other of the elements (radially inward for the pin and the linkage or radially outward for the wheel) allows the face 26b of the pin 26 to come into axial abutment on the surface 128a of the bush 128 (FIG. 3). The robot arm may apply a force to hold the pin in contact with the wheel on its surfaces 154a and 128a.

Figure 4C:
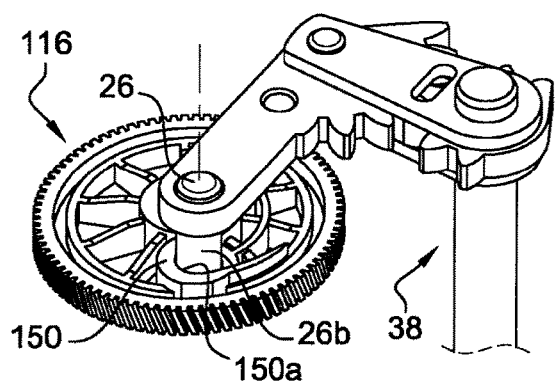

Another step of the method shown in FIG. 4c consists in moving one of the elements from the linkage 38 and the toothed wheel 116 towards the other of the elements by circumferential movement in rotation about the axis A or movement in translation relative to the axis A from the aforementioned second position to a contact third position in which the pin 26 is in circumferential contact against the wheel. The axial and radial contacts referred to above are preferably conserved. In the example shown the rotation allows the face 26b of the pin 26 to come into circumferential abutment on the surface 150a of the cradle 150 (FIG. 3). The rotation is facilitated by the cooperation by sliding of the faces 26a, 26b of the pin on the surfaces 154a and 128a, respectively, or even also on the surface 152a (FIG. 3). In the third position the axes B and C coincide.

Figure 4D:
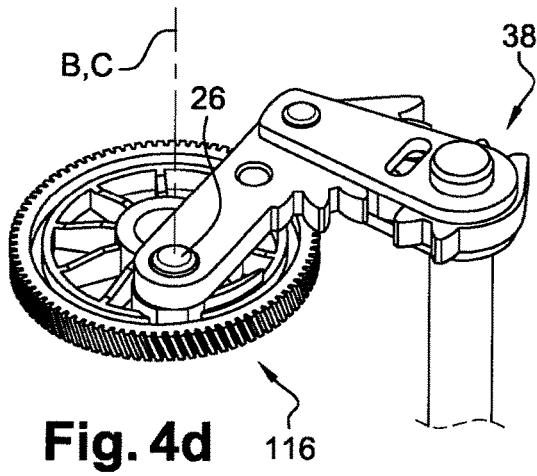

Another step of the method shown in FIG. 4d consists in moving one of the elements from the linkage 38 and the toothed wheel 116 toward the other of the elements by axial movement in translation from the aforementioned third position to a fourth position in which the pin is engaged in the orifice 124 in the wheel 116.

Figure 5:
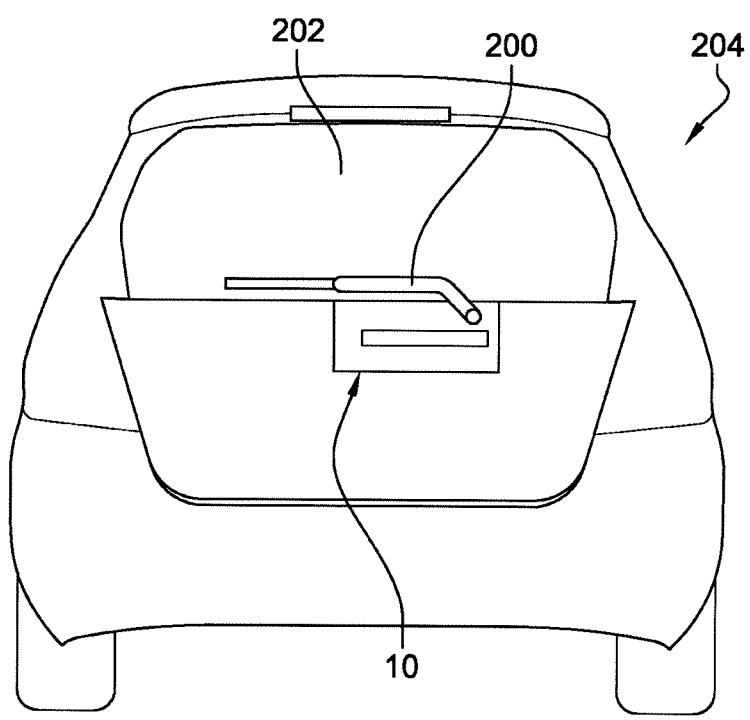
FIG. 5 is a highly diagrammatic view of a vehicle equipped with a wiper system including a gear motor according to the invention.

FIG. 5 shows a motor vehicle 204 equipped with a system 200 for wiping at least one of its windows 202. This system classically comprises a window wiper 206 driven with a to-and-fro movement by means of a gear motor 10 of the type described above and equipped with a wheel 116 as shown in FIG. 3.

The invention claimed is:

1. A toothed wheel for a gear motor of a window wiper of a motor vehicle, the toothed wheel comprising:
    a central member defining an axis of rotation A and two opposite substantially parallel faces, a first of said faces including an orifice having an axis B and intended to receive a pin of a linkage of the gear motor; and
    on said first face, abutment means in an axial direction and in a radial direction relative to axis A and guiding means that facilitates sliding in a circumferential direction about the axis A,
    said abutment and guiding means being configured to cooperate with said pin during an automatic assembly of the toothed wheel with the linkage to facilitate insertion of the pin into the orifice,
    wherein the abutment and guiding means comprise an abutment rib having a substantially circumferential orientation about the axis A,
    wherein the abutment and guiding means comprise a cradle, and
    wherein an opening of the cradle is oriented in a circumferential direction around the axis A.

2. The toothed wheel according to claim 1, further comprising on said first face a cylindrical bush having the axis A surrounded by and connected to a toothed ring by ribs.

3. The toothed wheel according to claim 1, wherein the abutment means comprise radial first abutment means.

4. The toothed wheel according to claim 1, wherein the abutment means comprise axial second abutment means.

5. The toothed wheel according to claim 1, wherein the guiding means comprise an external cylindrical first surface extending around said axis A.

6. The toothed wheel according to claim 1, wherein the guiding means comprise an internal cylindrical third surface extending around said axis A.

7. A window wiper gear motor for motor vehicles, comprising at least one toothed wheel according to claim 1.

8. The toothed wheel according to claim 1, wherein the abutment rib has a curved upper edge surface.

9. The toothed wheel according to claim 2, wherein the abutment means comprise circumferential third abutment means.

10. The toothed wheel according to claim 9, wherein the third abutment means are formed by a bottom of the cradle having a C or U shape.

11. The toothed wheel according to claim 10, wherein said cradle extends around said axis B.

12. The toothed wheel according to claim 3, wherein the first abutment means are formed by or situated on said bush.

13. The toothed wheel according to claim 4, wherein the second abutment means are formed by the abutment rib.

14. The toothed wheel according to claim 4, wherein the second abutment means cooperate in axial abutment with a free end face of the pin.

15. The toothed wheel according to claim 13, wherein the guiding means comprise a plane second surface substantially perpendicular to said axis A.

16. The toothed wheel according to claim 5, wherein the first surface is formed by or situated on said bush.

17. The toothed wheel according to claim 15, wherein the second surface is formed by or situated on said abutment rib.

18. The toothed wheel according to claim 6, wherein the third surface is formed by or situated on a guide rib having a substantially circumferential orientation about the axis A.

19. The toothed wheel according to claim 18 in which said central member is or comprises a second orifice.

20. A system for wiping a window of a motor vehicle, comprising a window wiper gear motor according to claim 7.

21. The toothed wheel according to claim 8, wherein a free end face of the pin cooperates by sliding along the curved upper edge surface of the abutment rib.

22. The toothed wheel according to claim 8, wherein a free end face of the pin comes into axial abutment on the curved edge surface of the abutment rib.

23. A method of assembling an assembly including a toothed wheel and a linkage for a window wiper gear motor for motor vehicles, the toothed wheel comprising a central member defining an axis of rotation A and two opposite substantially parallel faces, a first of said faces including an orifice having an axis B and intended to receive a pin of a linkage of the gear motor, and, on said first face, abutment means in an axial direction and in a radial direction relative to axis A and guiding means that facilitates sliding in a circumferential direction about the axis A, said abutment and guiding means being configured to cooperate with said pin during an automatic assembly of the toothed wheel with the linkage to facilitate insertion of the pin into the orifice, the method comprising:
   a) moving one of the linkage and the toothed wheel toward the other of the elements by axial and radial movement in translation relative to the axis A from a spaced first position in which an axis C of the pin is substantially parallel to the axis A to a contact second position in which said pin is in axial and/or radial contact against said abutment means;
   b) moving one of the linkage and the toothed wheel in rotation about the axis A relative to the other of the linkage and the toothed wheel by sliding the pin on said guiding means from the second position to a third position in which axes B and C coincide; and
   c) moving one of the linkage and the toothed wheel toward the other of the linkage and the toothed wheel by axial movement in translation relative to the axis A from the third position to a fourth position in which the pin is engaged in said orifice.

24. The method according to claim 23, wherein in the second position the pin is in radial and axial contact against the toothed wheel.

25. The method according to claim 23, wherein in the third position the pin is in circumferential contact against the toothed wheel.

26. The method according to claim 23, wherein the steps a), b) and c) are performed by robot means.

* * * * *